(12) United States Patent
Kim et al.

(10) Patent No.: US 9,718,904 B2
(45) Date of Patent: Aug. 1, 2017

(54) MICRODROPLET OR MICROPARTICLE WITH JANUS OR CORE-SHELL INTERNAL MORPHOLOGY FABRICATED FROM N-ISOPROPYLACRYLAMIDE

(71) Applicant: POSTECH ACADEMY-INDUSTRY FOUNDATION, Pohang-si, Gyeongsangbuk-do (KR)

(72) Inventors: Dong Sung Kim, Pohang-si (KR); Kyoung Duck Seo, Pohang-si (KR)

(73) Assignee: POSTECH ACADMEY-INDUSTRY FOUNDATION, Pohang-si, Gyeonsangbuk-Do (KR)

( * ) Notice: Subject to any disclaimer, the term of this patent is extended or adjusted under 35 U.S.C. 154(b) by 216 days.

(21) Appl. No.: 13/851,608

(22) Filed: Mar. 27, 2013

(65) Prior Publication Data

US 2014/0235808 A1   Aug. 21, 2014

(30) Foreign Application Priority Data

Feb. 19, 2013 (KR) ........................ 10-2013-0017516

(51) Int. Cl.
| | |
|---|---|
| *C08F 120/54* | (2006.01) |
| *C08F 120/56* | (2006.01) |
| *C08F 20/54* | (2006.01) |
| *C08F 20/56* | (2006.01) |
| *C08F 220/56* | (2006.01) |
| *C08F 220/54* | (2006.01) |

(52) U.S. Cl.
CPC ............ *C08F 120/56* (2013.01); *C08F 20/54* (2013.01); *C08F 20/56* (2013.01); *C08F 120/54* (2013.01); *C08F 220/56* (2013.01); *C08F 220/54* (2013.01)

(58) Field of Classification Search
CPC ........ C08F 120/56; C08F 20/54; C08F 20/56; C08F 220/56; C08F 220/54; C07C 233/91
See application file for complete search history.

(56) References Cited

U.S. PATENT DOCUMENTS

2007/0105972 A1*   5/2007   Doyle ................. B81C 99/0095
                                                              522/1

FOREIGN PATENT DOCUMENTS

| WO | WO 2009061372 A1 * | 5/2009 | .......... B01F 17/0028 |
|---|---|---|---|
| WO | WO2009061372 A1 | 5/2009 | |

OTHER PUBLICATIONS

Wiese, Susanne et al "Microgel-Stabilized Smart Emulsions for Biocatalysis", 2013 Publishied online Nov. 2012, Angewandte Chemie International Edition, 52, 576-579.*

(Continued)

*Primary Examiner* — Ling Choi
*Assistant Examiner* — David L Miller
(74) *Attorney, Agent, or Firm* — Lucas & Mercanti, LLP

(57) ABSTRACT

A microdroplet or microparticle with Janus or core-shell internal morphology, which is obtained under the control of phase separation of high-concentration NIPAAm formed at 25° C. or more in a microfluidic device, is provided. The microdroplet or microparticle shows an anisotropic volume change according to a change in temperature, and can also serve as a fat-soluble/water-soluble carrier, and thus can be used as a new material for medical supplies in the field of various applications in the future.

10 Claims, 11 Drawing Sheets

(56) References Cited

OTHER PUBLICATIONS

Yang, Chen et al "Laser-light Scattering Study of Internal Motions of Polymer Chans Grafted on Spherical Latex Particles", 2004, 108, 18479-18484.*
Shigeo Sasaki et al; Thermodynamic Properties of N-isopropylacrylamide in Water: Solubility Transition, Phase Separation of Supersaturated Solution, and Glass Formation; J. Phys. Chem; B 2010, 114, pp. 14995-15002.
Kyoung Duck Seo et al; Fabrication of Complex Shaped Poly(N-isopropylacrylamid) Microparticles Using Microfluidic Devices; The Korean Society of Mechanical Engineers (KSME) ; 2012.
Kyoung Duck Seo et al; Poly(N-isopropylacrylamid) Janus Microbydrogels in Hydrodynamic Focusing Microfluidic Devices (HFMD, The Korean BioChip Society 2012.
R.K. Shah, et al; Janus supraparticles by induced phase separation of nanoparticles in droplets; Adv. Mat.; 2009; vol. 21; pp. 1949-1953.

* cited by examiner

FIG. 10

| | Fat-soluble dye | Water-soluble dye |
|---|---|---|
| H-phase NIPAAm | Dissolved | Negligible |
| L-phase NIPAAm | Negligible | Dissolved |

MICRODROPLET OR MICROPARTICLE WITH JANUS OR CORE-SHELL INTERNAL MORPHOLOGY FABRICATED FROM N-ISOPROPYLACRYLAMIDE

CROSS-REFERENCE TO RELATED APPLICATION

This application claims priority to and the benefit of Korean Patent Application No. 2013-0017516, filed on Feb. 19, 2013, the disclosure of which is incorporated herein by reference in its entirety.

BACKGROUND

1. Field of the Invention

The present invention relates to a microdroplet or microparticle with Janus or core-shell internal morphology including N-isopropylacrylamide (NIPAAm) as a single component. More particularly, the present invention relates to a microdroplet or microparticle with Janus or core-shell internal morphology, which is obtained under the control of phase separation of high-concentration NIPAAm formed in a microfluidic device.

2. Discussion of Related Art

To facilitate drug delivery all over the world and improve a therapeutic effect, there is an increasing interest in development of microparticles having a small size and an excellent effect. Currently, a drug is delivered through a route of visible administration, for example, oral, intravenous, or cutaneous administration. Since use of a microparticle enables delivery of a target drug to an accurate site, effects of the drug may be maximized. However, conventional microparticles have limits of performance and functions since they have one space in the center thereof to be filled with a drug or a physiologically active material. For example, when at least two drugs have to be added to one microparticle, the drugs react with each other to show a medicinal effect before they are delivered to a desired site, which makes it difficult to control release of the drugs.

With regard to the microparticle, a hydrogel refers to a hydrophilic polymer forming a 3-dimensional network structure through a chemical or physical bond. A hydrogel may absorb a large amount of water in the polymer since it is highly hydrophilic. Here, an amount of water to be absorbed into the hydrogel may be determined according to chemistry of the polymer, a degree of hydrophilicity, and a level of crosslinking between polymer chains. In particular, the hydrogel has been widely used as a biomedical material since it has highly similar characteristics to in vivo cellular tissues, and thus exhibits few side effects even when it is inserted into a human body.

In recent years, there has been an increasing amount of research conducted to develop a hydrogel whose physical properties are altered by a reaction with external stimuli such as temperature, pH, light, a magnetic force, etc. Among these, poly-N-isopropylacrylamide (poly-NIPAAm) obtained by crosslinking NIPAAm is a representative temperature-sensitive hydrogel in which volume shrinkage and surface characteristics are caused at a temperature of 32° C., similar to body temperature.

In particular, Professor Okabe (Japan) reported solubility transition and phase separation taking place in high-concentration NIPAAm in 2010 (*J. Phys. Chem. B* 2010, vol. 114, 14995-15002). When a high concentration of NIPAAm is dissolved in water at 25° C. or more, at least two phases, that is, an H phase and an L phase, are formed due to solubility transition. It was reported that both the H and L phases include NIPAAm as a basic component material, but are not miscible with each other, and NIPAAm is present at a relatively higher concentration in the H phase, compared with the L phase.

Methods of preparing a hydrogel microparticle known in the related art include physical methods such as emulsification, coacervation, and spray drying, and chemical methods such as heterogeneous polymerization. With the development of microfluidic technology, there has been much research conducted on microfluidic devices to prepare various microdroplets/microparticles including a hydrogel microdroplet/microparticle. In this case, the microdroplet/microparticle prepared in the microfluidic device has advantages in that it may be formed with a uniform size, and its size may be easily controlled.

In spite of the advantages of the microfluidic device, however, preparation of a hydrogel microparticle using a conventional microfluidic device has been restricted to preparation of the hydrogel microparticle into a single phase. Since components of a fluid composed of a single phase are mixed by means of diffusion or stirring, a boundary is not clear in the structure of a finally prepared microdroplet/microparticle.

That is, to prepare a microdroplet/microparticle having a clear boundary, two fluids which are not mixed with each other should be used as dispersed phases, and another fluid which is not mixed with the two fluids should be used as a continuous phase. However, when a dispersed phase is composed of two fluids which are not mixed, different component materials should be selected for each fluid. As a result, it is impossible to obtain a particle composed of a single material.

Even when each of two fluids in the dispersed phase is composed of a single material, the two fluids are mixed due to diffusion caused by a difference in concentration between two dispersed phases, or undesirable disturbance caused by a continuous phase, which makes it difficult to prepare a microdroplet/microparticle having a divided clear boundary.

SUMMARY OF THE INVENTION

Therefore, the present inventors have made many attempts to develop a microdroplet/microparticle with Janus or core-shell internal morphology, which is composed of a single material and may have a clear boundary since H-phase NIPAAm and L-phase NIPAAm used as dispersed phases are not mixed with each other. Accordingly, the present invention is completed based on these facts.

More particularly, the present invention is designed to solve the problems of the prior art, and it is an object of the present invention to provide a microdroplet/microparticle with Janus or core-shell internal morphology which is composed of an NIPAAm single material. Here, the microdroplet/microparticle shows an anisotropic volume change (i.e., an anisotropic thermo-responsive behavior) according to a change in temperature and has carrier characteristics (lipophilic/hydrophilic loading properties) such as fat-solubility and water-solubility using phase separation which is an innate characteristic of high-concentration NIPAAm.

However, the problems to be solved according to the present invention are not limited to the above-described problems, and other problems which are not disclosed herein may be made apparent to those skilled in the art by the detailed description provided below.

One aspect of the present invention provides a microdroplet or microparticle including N-isopropylacrylamide (NIPAAm) as a single component. Here, the microdroplet or microparticle is prepared using phase separation of the NIPAAm, and has Janus morphology or core-shell internal morphology.

According to one exemplary embodiment of the present invention, the microdroplet or microparticle may be composed of an H-phase NIPAAm and an L-phase NIPAAm.

According to another exemplary embodiment of the present invention, a volume ratio between the H-phase NIPAAm and the L-phase NIPAAm in the microdroplet or microparticle may be adjusted.

According to still another exemplary embodiment of the present invention, the microdroplet or microparticle may be prepared using a microfluidic device.

According to still another exemplary embodiment of the present invention, the microdroplet or microparticle may be obtained by injecting the H-phase NIPAAm and the L-phase NIPAAm as dispersed phases and oil as a continuous phase to the microfluidic device.

According to still another exemplary embodiment of the present invention, the Janus morphology may be obtained by injecting a mineral oil, and the core-shell internal morphology may be obtained by injecting a silicone oil.

According to still another exemplary embodiment of the present invention, the H-phase NIPAAm and the L-phase NIPAAm may be obtained by dissolving the NIPAAm at 25° C. or more at a molar concentration 10 times higher than that of water and performing phase separation of the NIPAAm.

According to still another exemplary embodiment of the present invention, the microdroplet or microparticle may show an anisotropic volume change, depending on a change in temperature.

According to still another exemplary embodiment of the present invention, the microdroplet or microparticle may have fat-solubility and water-solubility carrier characteristics.

According to still another exemplary embodiment of the present invention, the microparticle may be obtained by adding a crosslinker and a photoinitiator to the microdroplet and UV-curing the microdroplet.

According to yet another exemplary embodiment of the present invention, the crosslinker may be N,N'-methylenebisacrylamide (MBAAm), and the photoinitiator may be 2-hydroxy-1-[4-(hydroxyethoxy)phenyl]-2-methyl-1-propanone.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which:

FIG. 10 is an image illustrating the fat-solubility characteristics of H-phase NIPAAm and the water-solubility characteristics of L-phase NIPAAm.

DETAILED DESCRIPTION OF EXEMPLARY EMBODIMENTS

Figure 1:
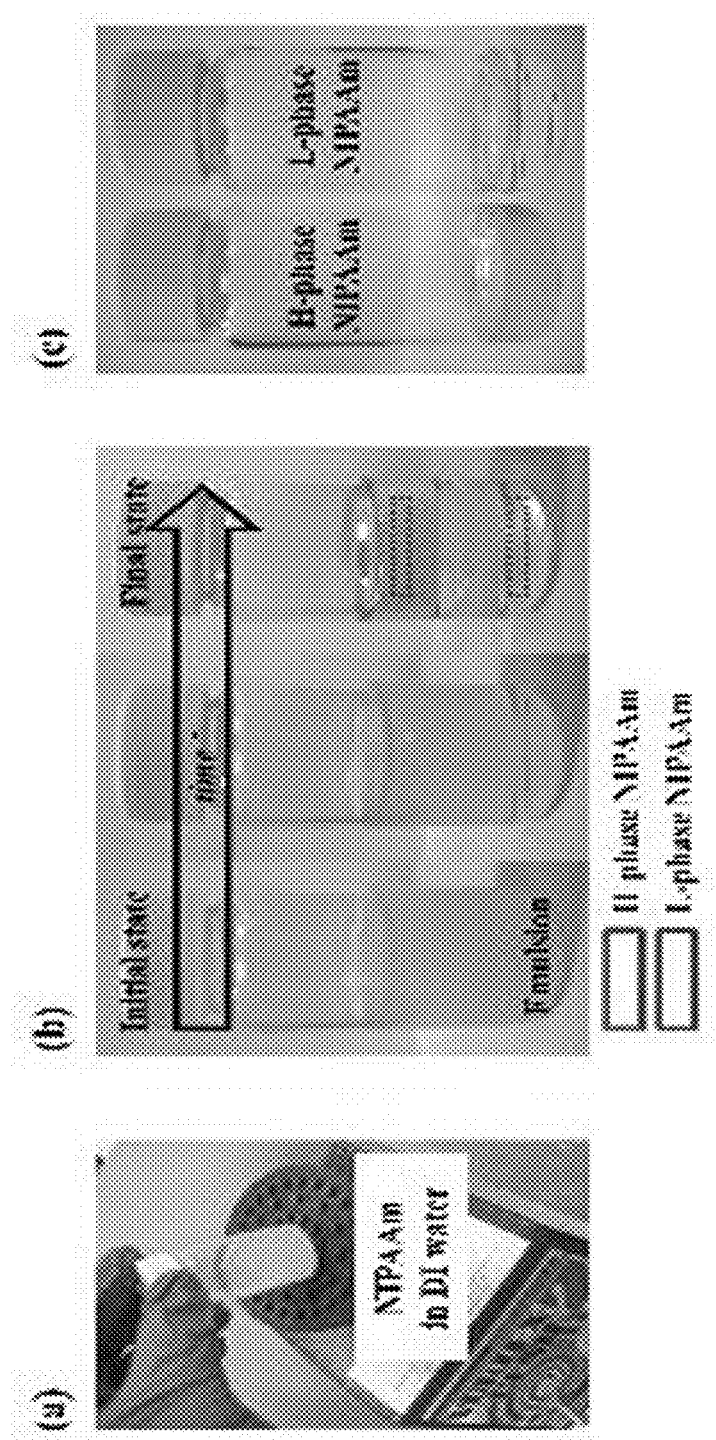
FIG. 1 is an image showing the phase separation appearing in high-concentration NIPAAm, and H-phase NIPAAm and L-phase NIPAAm formed by the phase separation.

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

The terminology used herein is for the purpose of describing particular embodiments only and is not intended to be limiting of exemplary embodiments. The singular forms "a," "an" and "the" are intended to include the plural forms as well, unless the context clearly indicates otherwise, it will be further understood that the terms "comprises," "comprising," "includes" and/or "including," when used herein, specify the presence of stated features, integers, steps, operations, elements, components and/or groups thereof, but do not preclude the presence or addition of one or more other features, integers, steps, operations, elements, components and/or groups thereof.

With reference to the appended drawings, exemplary embodiments of the present invention will be described in detail below.

According to the present invention, to prepare a microdroplet/microparticle with Janus or core-shell internal morphology, which includes NIPAAm as a single material, using a microfluidic device, first, very small amounts of fluids in a continuous phase and a dispersed phase, which are not mixed with each other, are continuously input into a microfluidic device using a pump.

In this case, preparation of a microfluidic device may be performed using a method such as UV lithography and polydimethylsiloxane (PDMS) molding generally known in the related art. To prepare a microdroplet/microparticle, characteristics of a surface of the microfluidic device are very important. In general, since PDMS shows hydrophobic surface properties, it is suitable for realizing the present invention.

According to the present invention, H-phase NIPAAm and L-phase NIPAAm are also used as dispersed phases. Here, each of the H-phase NIPAAm and the L-phase NIPAAm may be obtained using phase separation appearing in high-concentration NIPAAm. In this case, the phase separation automatically appears when NIPAAm is dissolved in water at 25° C. or more at a high concentration, that is, a molar concentration 10 times higher than that of water, for example, when the NIPAAm and water are mixed at a mass ratio of 1:1 to 2:1. Therefore, the phase separation may be very easily performed without performing an additional process.

According to the present invention, various known kinds of oil may also be used as a continuous phase. For example, a mineral oil or a silicone oil may be selected and used, as necessary. Here, a final shape of the microdroplet/microparticle may be controlled to have Janus morphology or core-shell internal morphology by altering the kinds of oil used.

In addition, according to the present invention, the added fluids in a continuous phase and a dispersed phase are formed into threads at the T-junction or cross-junction, and continuous microdroplets in a dispersed phase are formed due to the balance of a viscous force, interfacial tension, a capillary force, etc.

According to the present invention, volume ratios of the H-phase NIPAAm and the L-phase NIPAAm, each of which is occupied in a Janus microdroplet and/or microparticle, may also be adjusted by adjusting flow rates of the H-phase NIPAAm and the L-phase NIPAAm. For example, a volume ratio between the H-phase NIPAAm and the L-phase NIPAAm may be in a range of 1:3 to 3:1.

In addition, according to the present invention, to prevent aggregation of the prepared microdroplets, various known surfactants may be added to an oil. For example, a polysiloxane polyalkyl polyether copolymer may be used.

According to the present invention, a cured product, that is, a microparticle showing hydrogel characteristics, may also be obtained by mixing a crosslinker and a photoinitiator with the microdroplet. In this case, various known materials including N,N'-methylenebisacrylamide (MBAAm) may be used as the crosslinker, and various known materials including 2-hydroxy-1-[4-(hydroxyethoxy)phenyl]-2-methyl-1-propanone may also be used as the photoinitiator.

In addition, according to the present invention, a microparticle is a representative hydrogel which shows an anisotropic volume change according to a change in temperature and a concentration of the crosslinker. In this case, a volume change of the microparticle according to a change in temperature is a reversible process. In this case, when a temperature increases again to room temperature, the microparticle absorbs water, and expands in volume.

According to the present invention, the microparticle also has characteristics as a fat-soluble/water-soluble carrier.

In addition, according to the present invention, the expression "Janus microdroplet/microparticle" refers to a microdroplet/microparticle having a structure in which two different particle are bound to each other, as represented by the two-faced god "Janus" in Roman mythology.

Furthermore, according to the present invention, the expression "core-shell microdroplet/microparticle" refers to a microdroplet/microparticle having a structure including a material composed of a core part and another material surrounding the core part.

Hereinafter, preferred embodiments of preparation of microdroplets/microparticles with Janus or core-shell internal morphology, which include NIPAAm as a single material, according to the present invention will be described in further detail with reference to the accompanying drawings.

EXAMPLES

Example 1: Preparation of Microdroplet/Microparticle with Janus Morphology 1-1. Preparation of Dispersed Phase As dispersed phases, H-phase NIPAAm and L-phase NIPAAm were prepared using phase separation taking place in high-concentration NIPAAm. A water-soluble polymer, NIPAAm, was present in a single phase when the NIPAAm was present at a low concentration, but phase separation into two phases was caused at 25° C. or more with an increasing concentration of the NIPAAm.

In this Example, NIPAAm and water were mixed at 25° C. at a mass ratio of 1:1 (see FIG. 1A). It was also confirmed that, when NIPAAm was sufficiently dissolved in water, the H-phase NIPAAm and the L-phase NIPAAm were first formed into an emulsion, but the emulsion was finally separated into stable H-phase NIPAAm and L-phase NIPAAm with time (see FIG. 1B). The finally separated H-phase NIPAAm and L-phase NIPAAm were divided using a pipette (see FIG. 1C).

1-2. Preparation of Microfluidic Device

Figure 2:
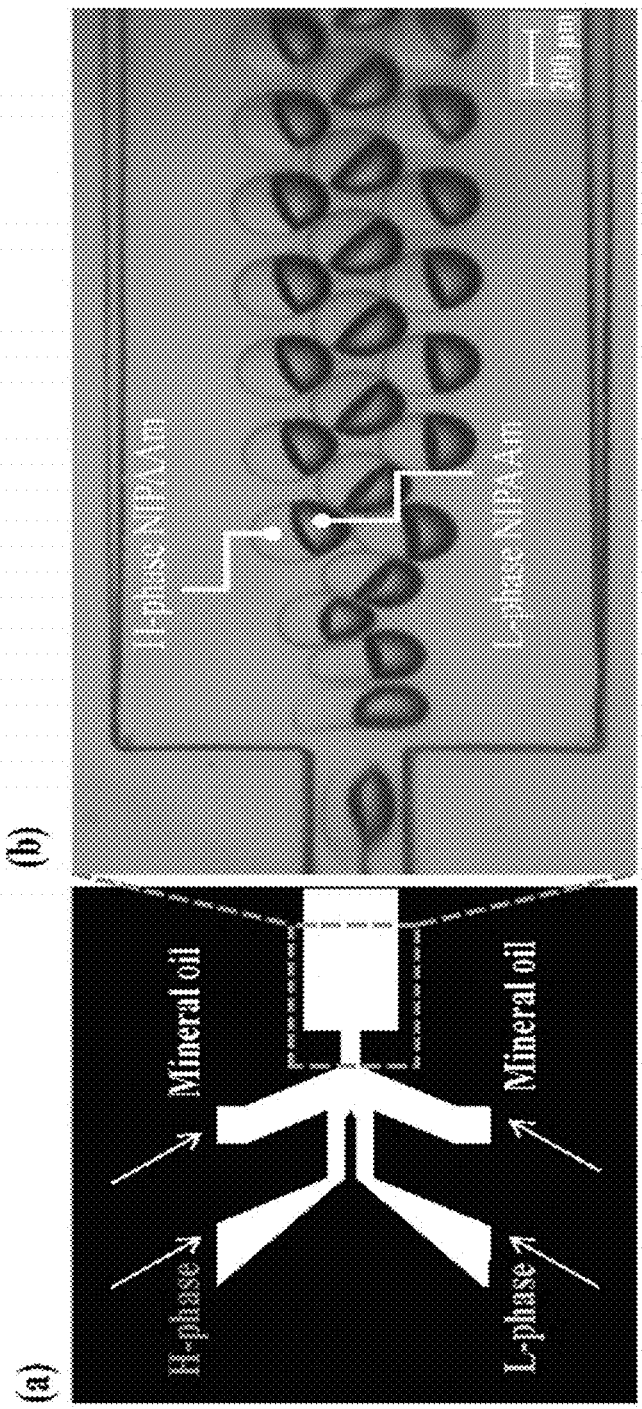
FIG. 2 is a schematic view of a microfluidic device configured to prepare a microdroplet including NIPAAm with Janus morphology as a single material, and an image showing a microdroplet with Janus morphology prepared using the microfluidic device.

To prepare a microdroplet/microparticle with Janus morphology, first, a microfluidic device was designed, as shown in FIG. 2A. In this Example, a microfluidic device was prepared using a UV lithography process and PDMS molding.

1-3. Preparation of Microdroplet

The H-phase NIPAAm and the L-phase NIPAAm as the dispersed phases prepared in Example 1-1 were injected into the PDMS microfluidic device prepared in Example 1-2 thorough two different channels using a precision pump, and a mineral oil in a continuous phase was injected through another channel (see FIG. 2A).

The injected H-phase NIPAAm and L-phase NIPAAm were formed into one dispersed phase at the front of an orifice of the PDMS microfluidic device, thereby forming threads. In this case, it could be seen that the one dispersed phase was formed into microdroplets with Janus morphology having a uniform size by means of the continuous phase, that is, a mineral oil (see FIG. 2B). As a result, it was revealed that the microdroplets showed clear boundaries between the H-phase NIPAAm and the L-phase NIPAAm.

Figure 3:
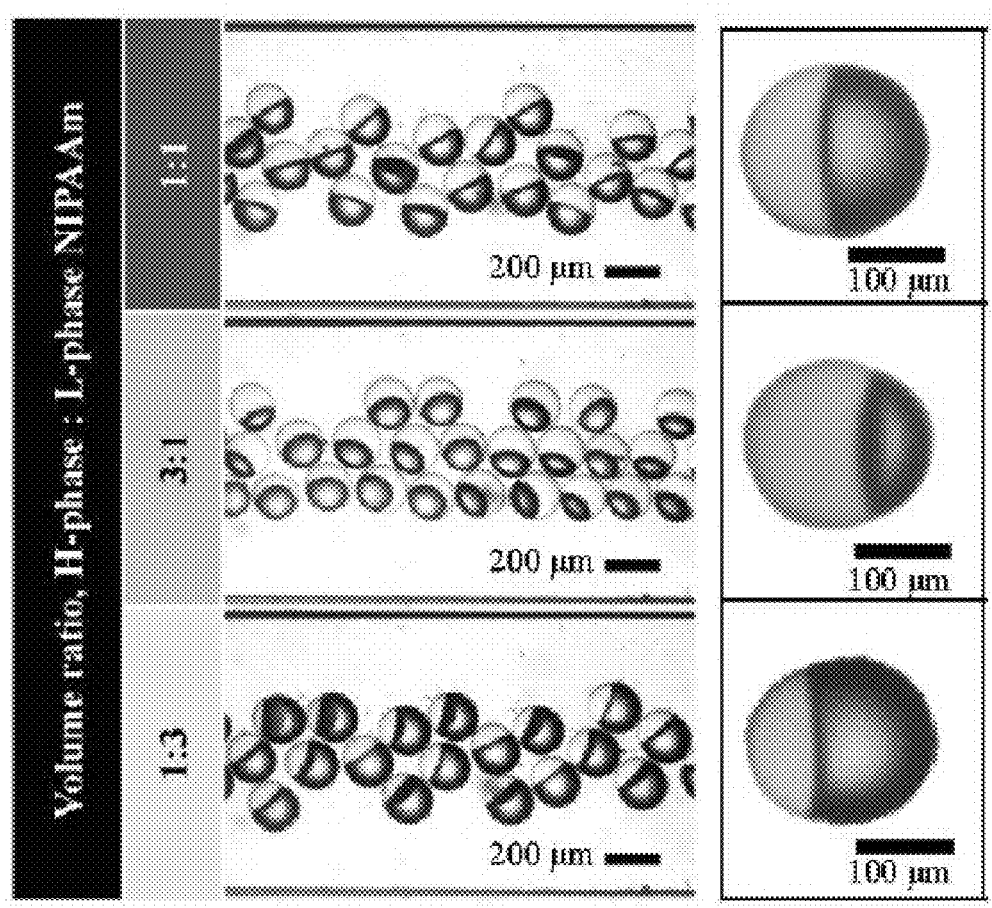
FIG. 3 is an image showing microdroplets with Janus morphology having different volume ratios, where the microdroplets may be prepared by adjusting a volume ratio between H-phase NIPAAm and L-phase NIPAAm.

As shown in FIG. 3, it could also be seen that volume ratios of the H-phase NIPAAm and the L-phase NIPAAm, each of which was occupied in the microdroplet with Janus morphology, were adjusted by adjusting flow rates of the H-phase NIPAAm and the L-phase NIPAAm. In this Example, the microdroplets with Janus morphology having different volume ratios were prepared by fixing a total of the flow rate to 4 µL min$^{-1}$, and altering a relative volume ratio between the H-phase NIPAAm and the L-phase NIPAAm to 3:1 to 1:3.

1-4. Preparation of Microparticle

Figure 4:
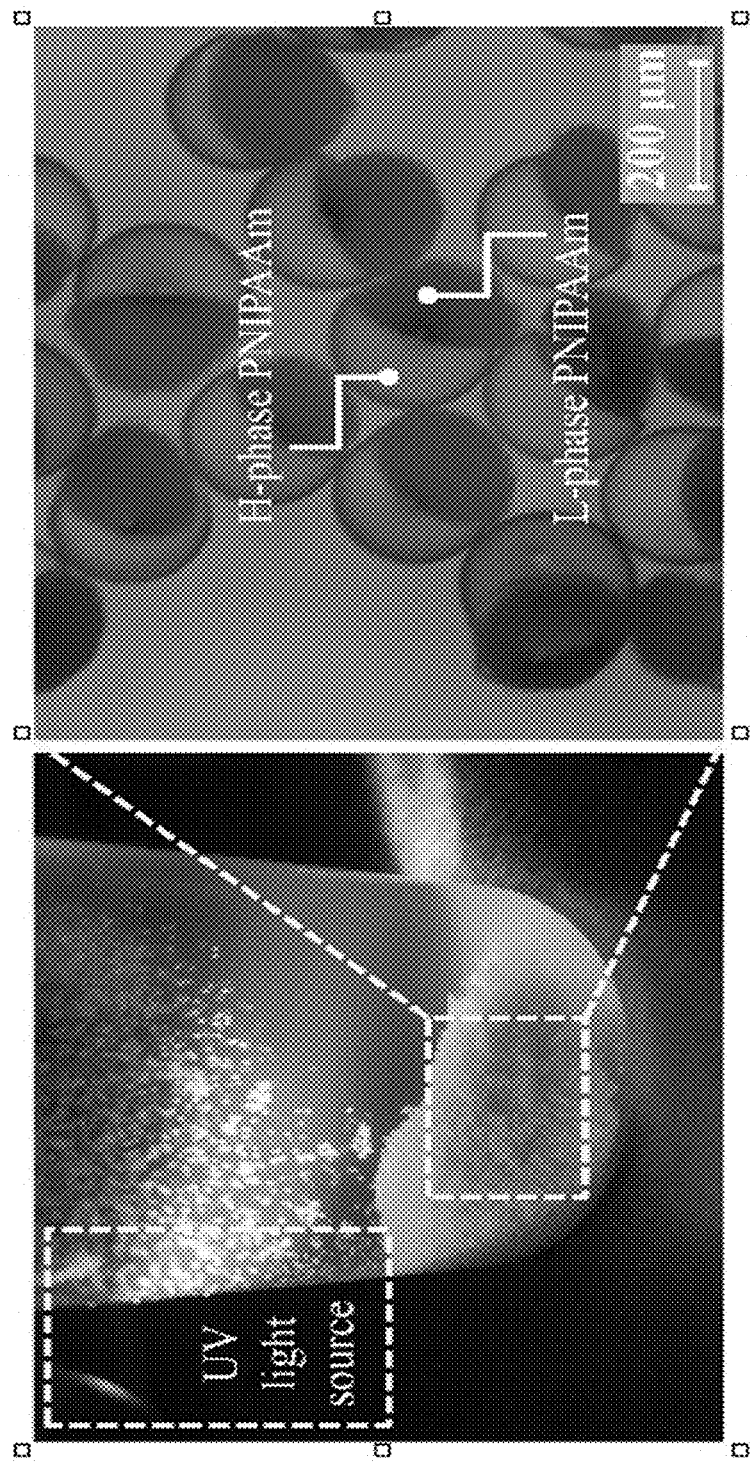
FIG. 4 is an image showing a microparticle with Janus morphology including NIPAAm as a single material, where the microparticle is obtained by UV-curing the microdroplet.

As shown in FIG. 4, the prepared microdroplets were photo-cured with UV rays to prepare microparticles with Janus morphology having a clear boundary. In this case, MBAAm was used as the crosslinker, and 2-hydroxy-1-[4-(hydroxyethoxy)phenyl]-2-methyl-1-propanone was used together as the photoinitiator.

Example 2: Preparation of Microdroplet/Microparticle with Core-Shell Internal Morphology A microdroplet with core-shell internal morphology was prepared using the same manner as the method of preparing a microdroplet with Janus morphology described in Example 1-3, except that a silicone oil was used instead of the mineral oil.

Figure 5:
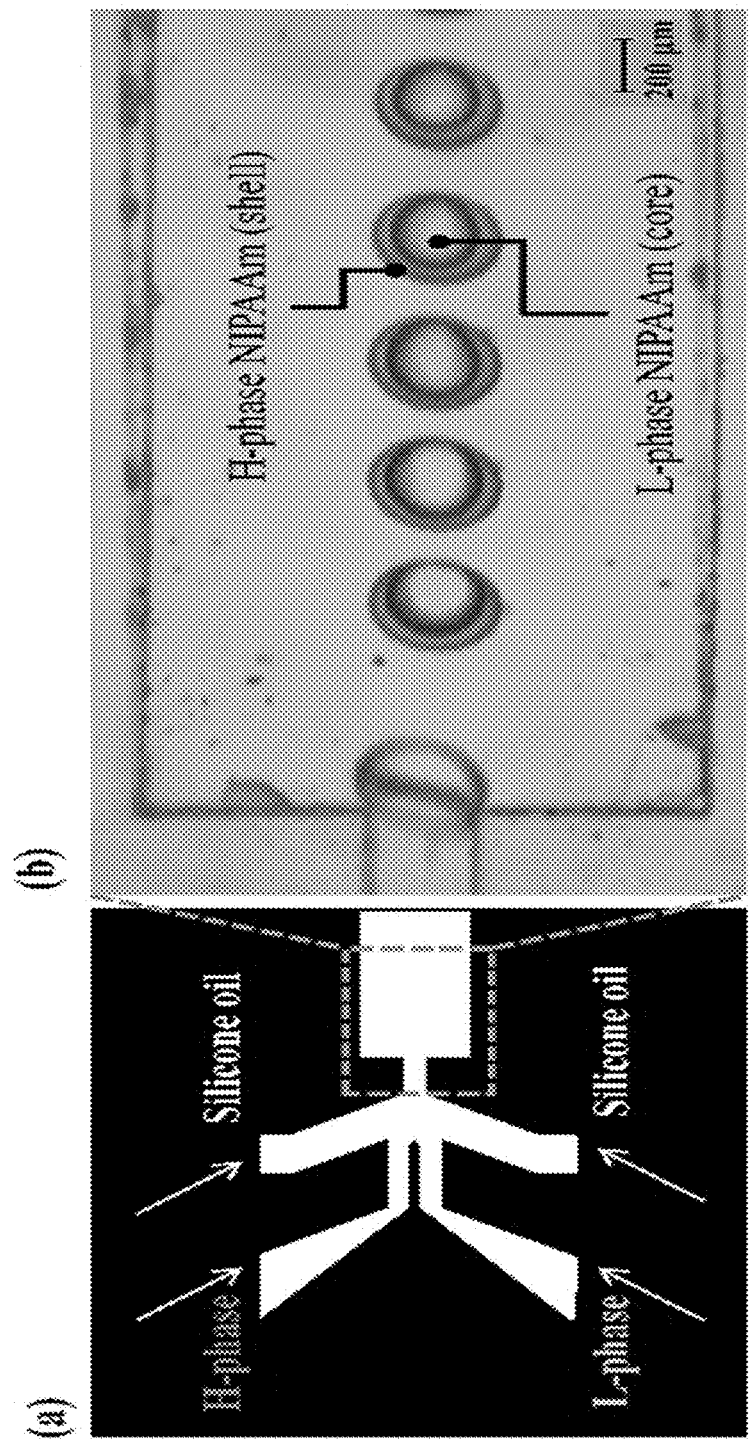
FIG. 5 is a schematic view of a microfluidic device configured to prepare a microdroplet including NIPAAm with core-shell internal morphology as a single material, and an image showing a microdroplet prepared using the microfluidic device.
Figure 6:
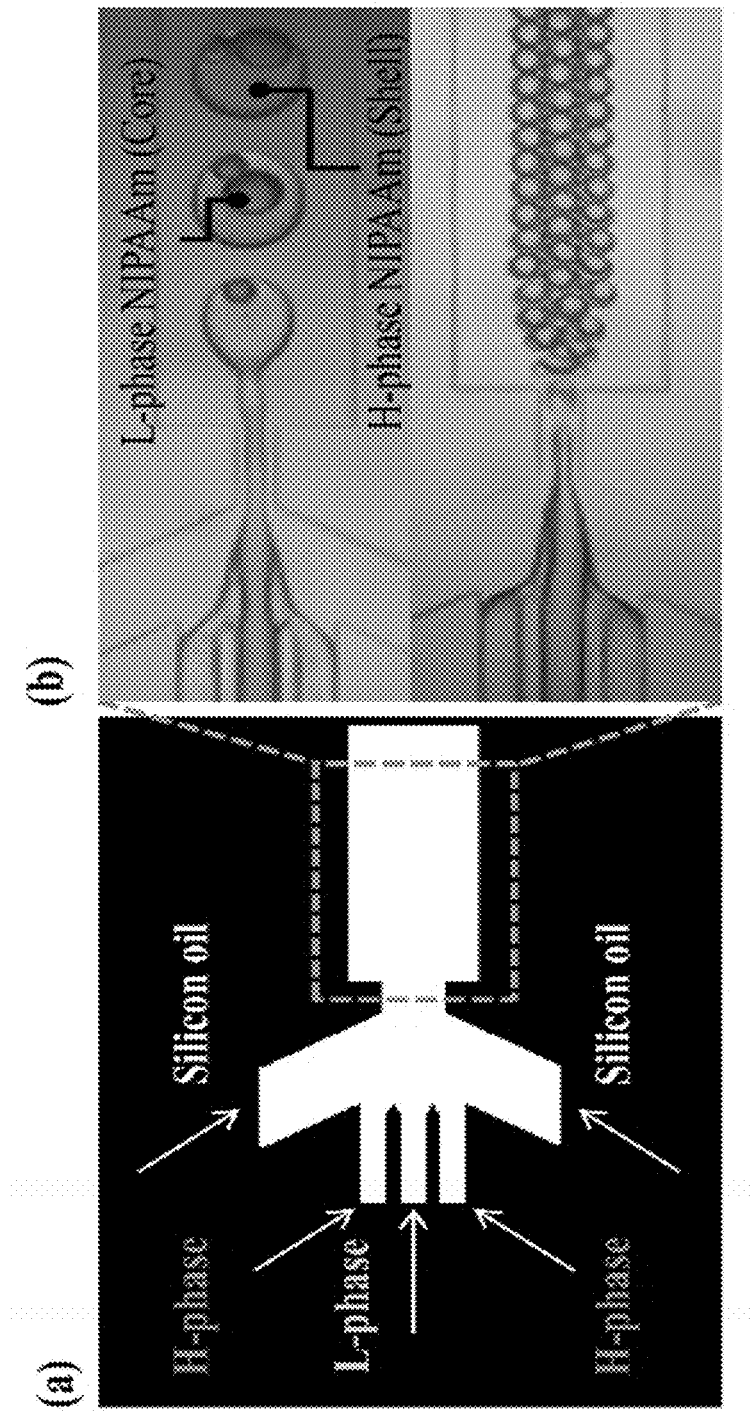
FIG. 6 is a schematic view of another microfluidic device configured to prepare a microdroplet including NIPAAm with core-shell internal morphology as a single material, and an image showing a microdroplet prepared using the microfluidic device.

However, a design of the microfluidic device shown in FIG. 5A or 6A was used as the design of the microfluidic device. Since the shape of the microdroplet in the microfluidic device was determined by interfacial energy between the dispersed phase and the continuous phase, a change in design of the microfluidic device did not affect the shape of the microdroplet. However, it could be seen that the design of the microfluidic device shown in FIG. 6A could be used to prepare a microdroplet with more stable core-shell internal morphology.

Since the silicone oil had a lower surface energy than the mineral oil, a microdroplet with core-shell internal morphology rather than the Janus morphology was also obtained. As shown in FIGS. 5B and 6B, the core-shell internal morphology in which a clear boundary was present between the H-phase NIPAAm and the L-phase NIPAAm was observed.

Figure 7:
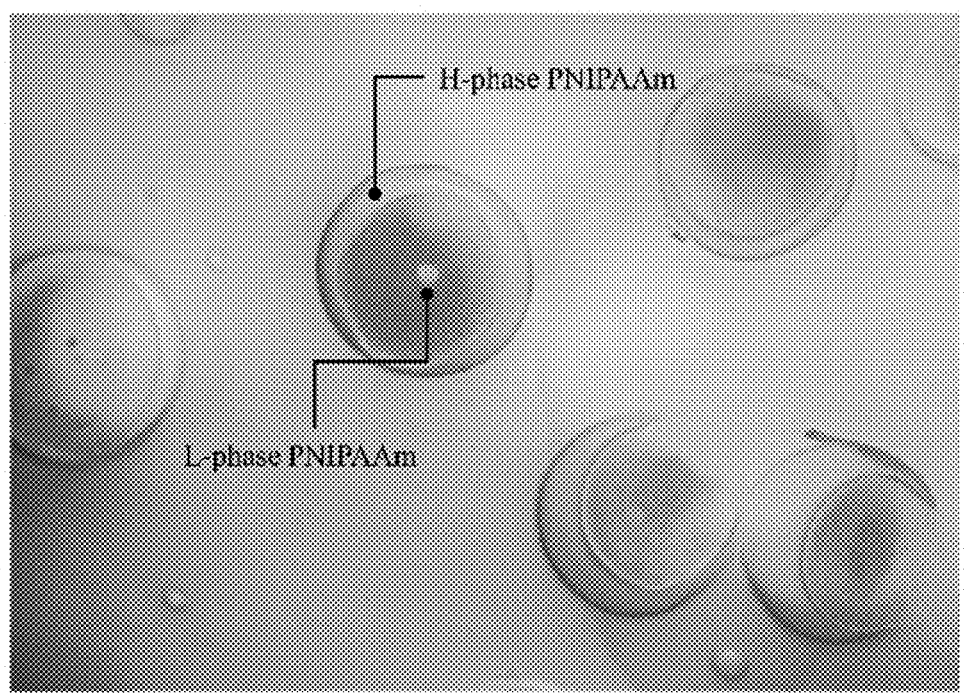
FIG. 7 is an image showing a microparticle with core-shell internal morphology including NIPAAm as a single material, where the microparticle is obtained by UV-curing the microdroplet.

As shown in FIG. 7, the prepared microdroplets were photo-cured with UV rays to prepare microparticles with core-shell internal morphology having a clear boundary. In this case, MBAAm was used as the crosslinker, and 2-hydroxy-1-[4-(hydroxyethoxy)phenyl]-2-methyl-1-propanone was used together as the photoinitiator.

Example 3: Anisotropic Volume Change According to Change in Temperature

To determine whether a volume of the microparticle with Janus morphology prepared in Example 1-4 was changed according to a change in temperature, the shape of the microparticle at a temperature ranging from 24° C. to 36° C. was observed.

Figure 8:
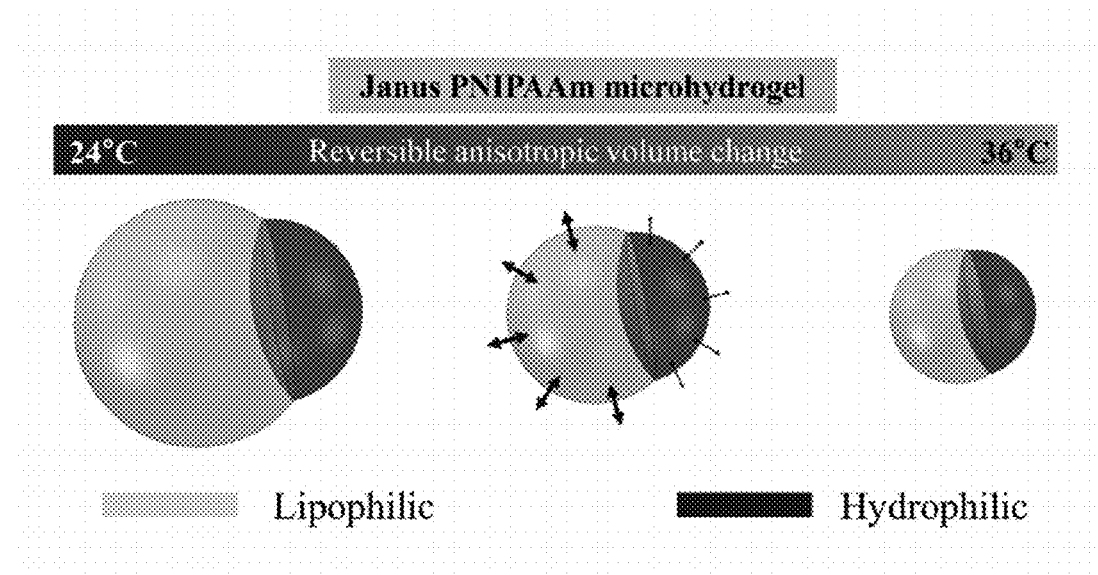
FIG. 8 is a schematic view illustrating an anisotropic volume change of a Janus microparticle including NIPAAm as a single material according to a change in temperature, and fat-solubility/water-solubility carrier characteristics of the Janus microparticle.

As a result, significant volume shrinkage was observed at 32° C. or more, as shown in FIG. 8. Also, volumes of the H-phase NIPAAm and the L-phase NIPAAm shrunk at different levels since they were present at different NIPAAm concentrations. That is, since the H-phase NIPAAm was present at a higher NIPAAm concentration than the L-phase NIPAAm, it could be seen that a change in volume shrinkage in a portion of the H-phase NIPAAm (yellow portion) was higher than that of a portion of the L-phase NIPAAm (blue portion).

Example 4: Anisotropic Volume Change According to Concentration of Crosslinker

To determine whether a volume of the microparticle with Janus morphology prepared in Example 1-4 was changed according to a concentration of a crosslinker, the shape of the microparticle was observed when the crosslinker was present at a concentration of 0.1 mole % to 0.005 mole % based on a total mole of the NIPAAm.

Figure 9:
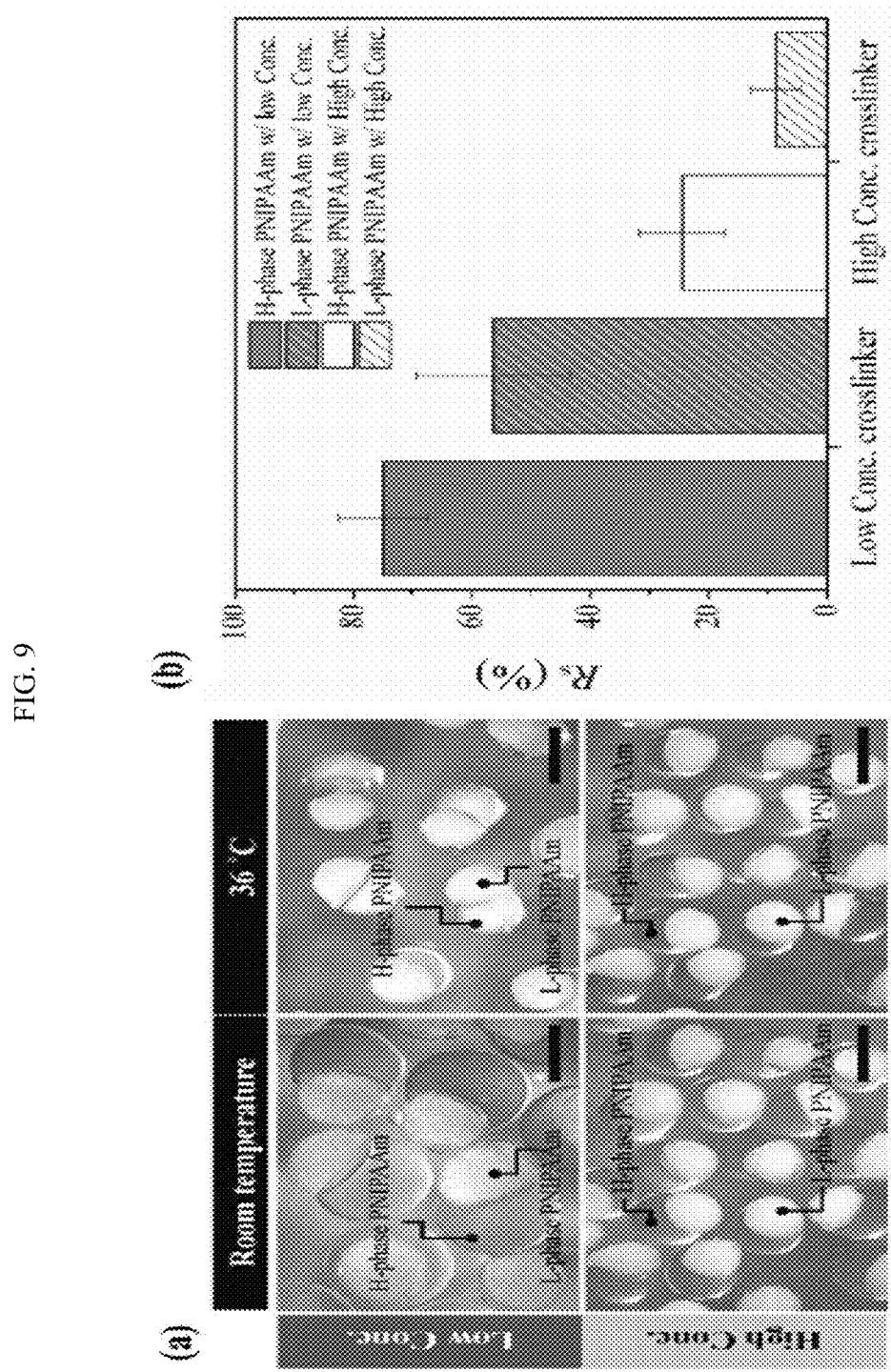
FIG. 9 is an image (FIG. 9A) showing a volume change of a Janus microparticle including NIPAAm as a single material according to a crosslinker and temperature, and a graph (FIG. 9B) plotted by quantifying the volume change of the Janus microparticle.

As a result it could be seen that the H-phase poly-NIPAAm in which the crosslinker was present at a low concentration of 0.005 mole % had the highest change in volume, as shown in FIG. 9A. This was because that penetration of particles was difficult due to dense crosslinking between microparticles showing hydrogel characteristics as the crosslinker was present at an increasing concentration, thereby causing a decrease in a volume change with an increasing temperature.

To quantitatively analyze the change in volume, a shrinkage ratio ($R_s$) was also defined according to the following Equation 1 when the temperature increased from room temperature to 32° C. The results are shown in FIG. 9B $$R_s = \frac{V_f - V_i}{V_i}$$ Equation 1

$V_i$: Volume at 25° C., $V_f$: Volume at 32° C.

Example 5: Characteristics of Fat-Soluble/Water-Soluble Carrier

To determine whether the microparticle with Janus morphology prepared in Example 1-4 had characteristics as a fat-soluble/water-soluble carrier, first, Sudan II (red) and Black water ink (black) were used as the fat-soluble dye and the water-soluble dye, respectively, to dissolve the H-phase NIPAAm and the L-phase NIPAAm prepared as the dispersed phases in Example 1-1.

As a result, it could be seen that the fat-soluble dye, Sudan II (red), can be dissolved in the H-phase NIPAAm, and the water-soluble dye, Black water ink (black), can be dissolved in the L-phase NIPAAm, as shown in FIG. 10.

Figure 11:
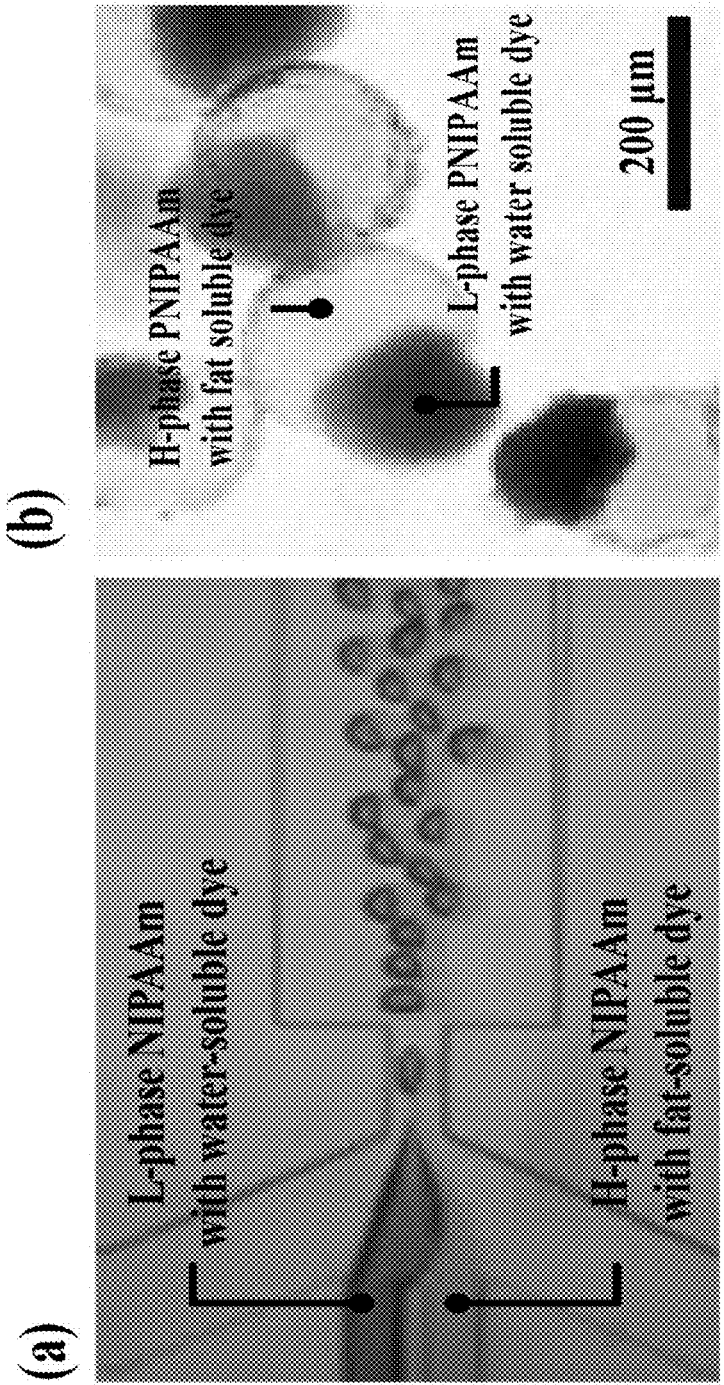
FIG. 11 is an image showing a microdroplet/microparticle showing characteristics as a fat-soluble/water-solubility carrier.

Therefore, the fat-soluble dye, Sudan II (red), was dissolved in the H-phase NIPAAm, and the water-soluble dye, Black water ink (black), was dissolve in the L-phase NIPAAm. Thereafter, the same method as described in Example 1-3 was performed to prepare a microdroplet with Janus morphology (see FIG. 11A). Subsequently, the microdroplet was UV-cured in the same manner as in Example 1-4 to prepare a microparticle with Janus morphology. As a result, the microparticle with Janus morphology showing the fat-solubility/water-solubility carrier characteristics was prepared, as shown in FIG. 11B.

According to the present invention, a microdroplet/microparticle with functional Janus or core-shell internal morphology may be provided, which can be useful in controlling delivery of a drug in the future, and can be used as a new material for medical supplies which may be included together with a fat-soluble/water-soluble drug.

According to the present invention, the microdroplet/microparticle can be applied to the field of various applications including tissue engineering and sensors in addition to the drug delivery system.

While the invention has been shown and described with reference to certain exemplary embodiments thereof, it will be understood by those skilled in the art that various changes in form and details may be made therein without departing from the scope of the invention as defined by the appended claims.

What is claimed is:

1. A microdroplet consisting of H-phase N-isopropylacrylamide (NIPAAm) and L-phase NIPAAm, wherein the H-phase NIPAAm and the L-phase NIPAAm are prepared using phase separation of a single component aqueous solution consisting of NIPAAm and water, the microdroplet has a single clear boundary between phases, and the microdroplet has Janus morphology or core-shell internal morphology.

2. The microdroplet according to claim 1, wherein the H-phase NIPAAm and the L-phase NIPAAm are obtained by dissolving in water the NIPAAm at 25° C. or more at a molar concentration 10 times higher than that of water and performing phase separation of the NIPAAm.

3. The microdroplet according to claim 1, wherein the Janus morphology is obtained by injecting a mineral oil into a microfluidic device, and the core-shell internal morphology is obtained by injecting a silicone oil into a microfluidic device.

4. The microdroplet according to claim 1, wherein the microdroplet is prepared by injecting a H-phase NIPAAm and a L-phase NIPAAm in range of a volume ratio 1:3 to 3:1 as dispersed phases and oil as a continuous phase to a microfluidic device.

5. The microdroplet according to claim 1, wherein the microdroplet shows fat-solubility and water-solubility carrier characteristics.

6. A microparticle obtained by curing the microdroplet of claim 1.

7. The microparticle according to claim 6, wherein the microparticle is obtained by adding a cross linker and a photoinitiator to the microdroplet.

8. The microparticle of claim 7, wherein the cross linker is N,N'-methylenebisacrylamide (MBAAm), and the photo initiator is 2-hydroxy-1-[4-(hydroxyethoxy)phenyl]-2-methyl-1-propanone.

9. The microparticle according to claim 6, wherein the microparticle shows fat-solubility and water-solubility carrier characteristics.

10. The microparticle according to claim 6, wherein the microparticle shows an anisotropic volume change depending on a change in temperature ranging from 24° C. to 36° C.

* * * * *